US005400207A

United States Patent [19]

Krause

[11] Patent Number: 5,400,207

[45] Date of Patent: Mar. 21, 1995

[54] ISOLATOR-ARRESTER ASSEMBLY

[75] Inventor: John A. Krause, Eastlake, Ohio

[73] Assignee: Hubbell Incorporated, Orange, Conn.

[21] Appl. No.: 154,010

[22] Filed: Nov. 18, 1993

[51] Int. Cl.[6] ............ H02H 9/04

[52] U.S. Cl. ............ 361/117; 361/127; 361/132

[58] Field of Search ............ 361/117, 127, 132, 55, 361/56, 120; 337/30, 32; 340/637

[56] References Cited

U.S. PATENT DOCUMENTS

| | | | |
|---|---|---|---|
| 1,939,371 | 12/1933 | Spurgeon | 361/39 |
| 2,200,496 | 5/1940 | Fox | 337/180 |
| 2,305,436 | 12/1942 | McMorris | 337/30 |
| 2,464,565 | 3/1949 | Evans | 361/39 |
| 2,704,795 | 3/1955 | Miller | 337/190 |
| 2,871,313 | 1/1959 | Chabala | 361/41 |
| 3,073,993 | 1/1963 | Leonard | 337/190 |
| 3,239,631 | 3/1966 | Snell | 337/30 |
| 3,467,934 | 9/1969 | Innis | 337/190 |
| 3,958,205 | 5/1976 | Beard | 337/178 |
| 4,480,244 | 10/1984 | Manning | 337/174 |
| 4,609,902 | 9/1986 | Lenk | 361/124 |
| 4,688,013 | 8/1987 | Nishikawa | 337/168 |
| 4,700,259 | 10/1987 | Stokes | 361/124 |
| 4,710,847 | 12/1987 | Kortschinski | 361/125 |
| 4,885,561 | 12/1989 | Veverka | 337/178 |
| 4,975,797 | 12/1990 | Veverka | 361/131 |
| 5,057,810 | 10/1991 | Raudabaugh | 337/30 |
| 5,113,167 | 5/1992 | Raudabaugh | 337/30 |
| 5,237,482 | 8/1993 | Osterhout et al. | 361/117 |

*Primary Examiner*—Todd DeBoer

*Attorney, Agent, or Firm*—Mark S. Bicks; Jerry M. Presson

[57] ABSTRACT

An arrester assembly for protecting a circuit from electrical switching and lightning surges includes an isolator and a surge arrester. The isolator has one electrically conductive terminal connected to a power line conductor. The other isolator electrically conductive terminal is connected by a flexible electrical conductor to one terminal of the surge arrester. The opposite electrical terminal of the surge arrester is connected by a conductive support to ground. The isolator, flexible conductor and surge arrester are connected in sequence and in series between the power line conductor and ground.

12 Claims, 2 Drawing Sheets

ISOLATOR-ARRESTER ASSEMBLY

FIELD OF THE INVENTION

The present invention relates to an assembly of an isolator and a surge arrester for connecting a power line conductor to ground to protect the circuit including the power line conductor from current surges. More particularly, the present invention involves connecting the isolator between the power line conductor and the surge arrester by a flexible conductor.

BACKGROUND OF THE INVENTION

Lightning or surge arresters are typically connected to power lines to carry electrical surge currents to ground, and thus, prevent damage to the lines and the equipment connected thereto. Arresters offer high resistance to normal voltage across power lines, yet offer very low resistance to surge currents produced by sudden high voltage conditions, caused, for example, by lightning strikes. After the surge, the voltage drops and the arrester should normally return to a high resistance condition. However, upon arrester malfunction or failure, the high resistance condition is not resumed by the arrester, and the arrester continues to provide an electrical path from the power line to the ground. The line will ultimately lockout due to the short circuit condition or breakdown of the distribution transformers. Additionally, the arrester will have to be replaced.

To avoid line lockout, isolators or disconnectors are commonly used in combination with the arresters to separate a malfunctioning arrester from the circuit and provide a visual indication of arrester failure. Isolators or disconnectors have an explosive charge to destroy the circuit path and physically separate the electrical terminals of the isolator. Known isolators are disclosed in U.S. Pat. Nos. 5,057,810 and 5,113,167 to Raudabaugh.

Conventionally, as disclosed in the two Raudabaugh patents, the arrester is located between the power line and the disconnector or isolator. Specifically, the lightning or surge arrester is connected directly to the power line while the isolator or disconnector is located between the arrester and the ground, such that the power line, arrester, isolator and ground are connected in series and in that sequence. Other examples of this conventional arrangement of the surge arrester and isolator are disclosed in U.S. Pat. No. 2,305,435 to McMorris and U.S. Pat. No. 4,710,847 to Kortschinski.

U.S. Pat. No. 2,464,565 to Evans discloses a lightning arrester assembly in which the lightning arrester is coupled to a power line through a lead line, a disconnecting device and a cut-out device. The cut-out device is connected both to a transformer and a power line. The disconnecting device is mechanically actuated upon shattering of the arrester top. The shattering of the arrester top and its movement from the separated bottom portion of the arrester top causes a mechanical disengagement and separation of the two connected terminals of the disconnecting device. In this manner, the arrester assembly according to the Evans patent requires fracturing and separation of the upper and lower portions of the arrester to effect separation of the disconnecting device terminals. If the arrester fails electrically, without exploding and breaking apart, the Evans device does not separate the disconnecting device.

SUMMARY OF THE INVENTION

An object of the present invention is to provide an arrester assembly or surge protection system which, upon separation of the isolator, places the connection between the isolator and the arrester and the arrester itself at ground potential, not line potential.

Another object of the present invention is to provide an arrester assembly and surge protection system in which tracking on an insulating bracket is no longer of concern.

A further object of the present invention is to provide an arrester assembly and surge protection system which enables the arrester to be directly coupled to a conductive bracket, thereby eliminating a need for an insulating bracket.

A yet further object of the present invention is to provide an arrester assembly and surge protection system where the isolator is connected directly to a power line at one end and to the arrester at its opposite end by a flexible conductor so that when the isolator explodes or separates, the flexible conductor will drop away to separate the arrester from the power line and provide a clear visual indication of arrester failure.

The foregoing objects are obtained by an arrester assembly comprising a surge arrester, an isolator, a flexible electrical conductor, an electrically conductive clamp means, and an electrically conductive support means. The surge arrester has first and second electrically conductive arrester terminals at its opposite ends. The isolator has first and second electrically conductive isolator terminals at its opposite ends. The isolator includes coupling means for electrically connecting the isolator terminals when the surge arrester functions properly and for physically disconnecting the isolator terminals when the surge arrester electrically malfunctions. The flexible conductor connects the second isolator terminal to the first arrester terminal. The conductive clamp means connects the first isolator terminal to a power line conductor. The conductive support means connects the second arrester terminal to ground.

The foregoing objects are also obtained by a surge protection system comprising a power line conductor, an isolator, a flexible elongated electrical conductor and electrically conductive ground connector means. The isolator has first and second electrically conductive isolator terminals on its opposite ends. The isolator includes coupling means for electrically connecting the isolator terminals when low currents and high pulse currents flow between the isolator terminals and for physically separating the isolator terminals when high prolonged currents flow between the isolator terminals. The first isolator terminal is coupled to the power line conductor. The flexible conductor has opposite first and second ends, with the first end being connected to the second isolator terminal. The surge arrester is spaced from the isolator and has first and second electrically conductive arrester terminals at its opposite ends. The second end of the flexible connector is coupled to the first arrester terminal. The ground connector means is coupled to the second arrester terminal for coupling the surge arrester to ground.

By forming the arrester assembly and surge protection system in this manner, the isolator, flexible conductor and surge arrester are connected in sequence and in series between the power line conductor in the ground. If the surge arrester fails, the isolator will separate and the flexible conductor will drop away with the separated portion of the isolator. This separation provides a clear visual indication of the arrester failure and completely physically and electrically separates the arrester from the power line conductor. Upon separation, the arrester and the strap separated from the isolator are at ground potential, not at line potential, as would occur if the isolator was located between the ground and the arrester. With the failed arrester at ground potential, a safer condition is provided, for example, for a lineman replacing the failed arrester. This arrangement also eliminates the need for an insulating bracket, permitting direct coupling of the arrester to the conductive bracket.

Other objects, advantages and salient features of the present invention will become apparent from the following detailed description, which, taken in conjunction with the annex drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
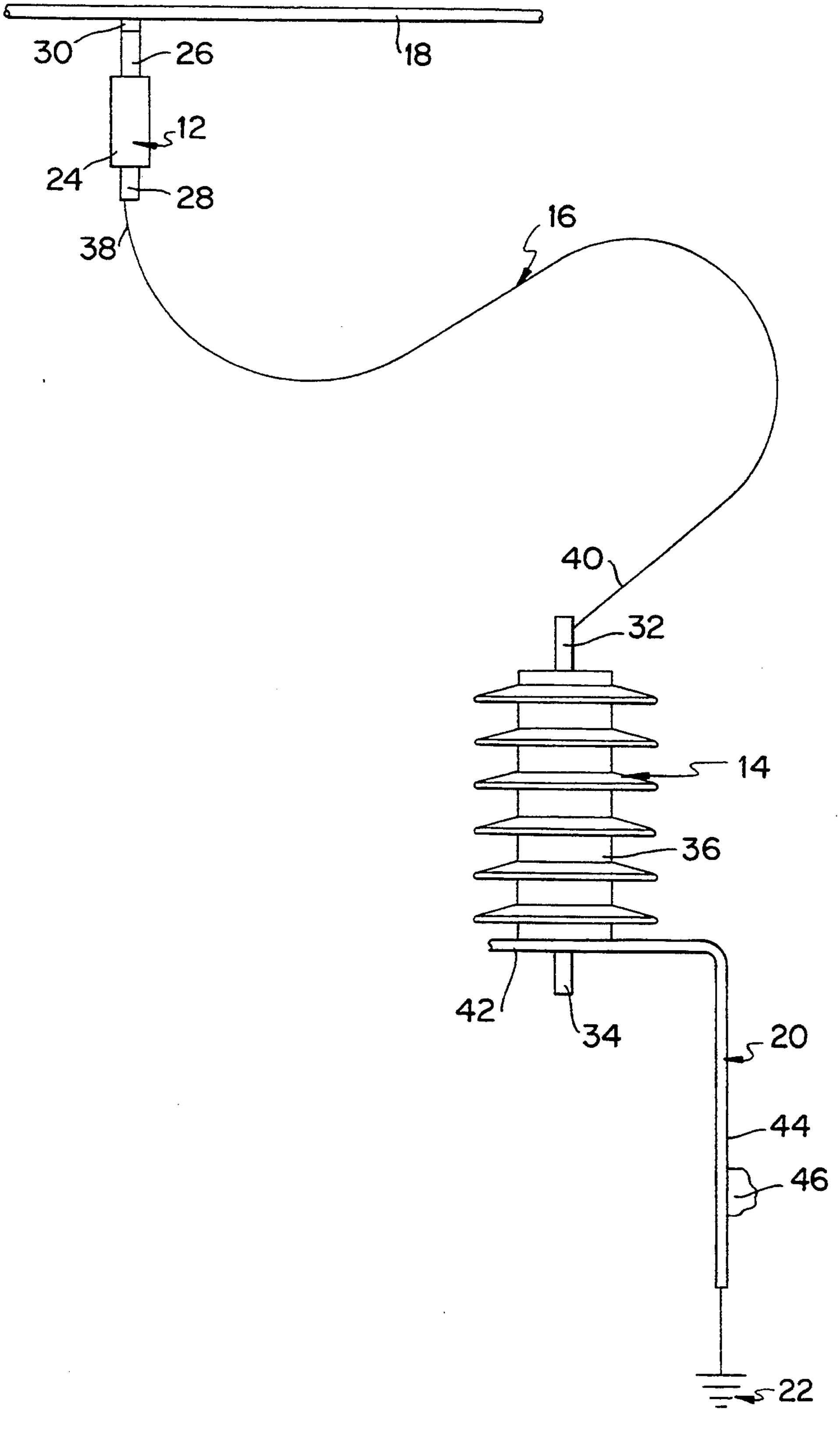
FIG. 1 is a diagrammatic side elevational view illustrating a lightning or surge protection system coupled to a power line according to one embodiment of the present invention.

Referring initially to FIG. 1, the present invention comprises an arrester assembly or a lightning/surge protection system comprising an isolator or disconnector 12, a surge arrester 14 and a flexible conductive strap 16 connecting the isolator to the arrester. The isolator is coupled to a power line conductor 18 at one end of isolator 12. The opposite end of the isolator is coupled by strap 16 to one end of arrester 14. The opposite end of arrester 14 is mounted on a conductive support bracket 20 to connect the arrester to ground 22. In this manner, the isolator, strap and arrester are connected between the power line conductor and the ground in series and in that sequence.

Isolator 12 is of the type disclosed in U.S. Pat. No. 5,057,810 or 5,113,167 to Raudabaugh, the subject matters of which are hereby incorporated by reference, or the equivalent structure. The isolator includes a body 24 and two electrically conductive terminals 26 and 28 extending axially from the opposite longitudinal ends of isolator body 24. Isolator terminal 26 is coupled by a clamp 30 to power line conductor 18 so as to be supported by and electrically connected to power line conductor 18.

Isolator 12 is constructed such that normal low currents pass through the isolator and the arrester without activating the detonating mechanism within the isolator. When exposed to lightning or switching surge currents, arrester 14 provides a low resistance circuit through which the high current passes. The lightning or switching surge current is of short duration and does not activate the isolator detonating mechanism. If the surge or lightning arrester 14 fails to withstand system voltage, short circuit currents of relatively high amperes can flow through the faulted arrester. Such prolonged short circuit currents of high amperage will cause the internal isolator detonating mechanism, including an explosive charge within the isolator, to detonate. Detonation of the explosive charge causes the isolator to break apart or the terminals to blow out of body 24.

Lightning or surge arrester 14 is conventional, and thus, is not described in detail. The arrester can be formed according to U.S. Pat. Nos. 4,656,555, 4,899,248 and 5,138,517 to Raudabaugh and U.S. Pat. No. 5,043,838 to Sakich, the subject matters of which are hereby incorporated by reference. The arrester has two electrically conductive arrester terminals 32 and 34 which extend from the ends of the arrester body 36.

Strap 16 comprises a suitable flexible electrical conductor having one end 38 attached to isolator terminal 28 and a second, opposite end of 40 connected to arrester terminal 32. The strap electrically and mechanically couples terminal 28 to terminal 32. When the isolator is intact, i.e., before isolator detonation, the strap extends generally in the configuration illustrated in FIG. 1. Upon detonation of the isolator and separation of the isolator terminals 26 and 28, the strap will fall away under its own weight to ensure complete separation of the arrester from power line 16 upon isolator detonation.

Support bracket 20 is formed of metal, preferably steel, and is electrically conductive. The bracket is generally L-shaped, having a horizontal leg 42 underlying and supporting arrester 14, and a vertical leg 44. Vertical leg 44 provides means for mounting the surge arrester to a pole (e.g., a utility pole) or a grounded transformer. In this manner, the support bracket is electrically and mechanically coupled to arrester terminal 34, and connects the arrester electrically to ground 22.

The arrester assembly or surge protection system is assembled as illustrated in FIG. 1. Clamp 30, arrester 12, strap 16, surge arrester 14 and support bracket 20 are connected in sequence and in series between power line conductor 18 and ground 22. This arrangement allows the surge arrester to be connected directly to a conductive bracket, eliminating a need for an insulating bracket.

When the surge arrester operates or functions properly, low currents and high pulse currents can flow through the isolator terminals without detonating the isolator explosive charge within isolator body 24. However, when prolonged high short circuit currents pass through the isolator due to an electrical malfunction of the arrester, the explosive charge within isolator body 24 is detonated separating isolator terminal 26 from isolator terminal 28.

Figure 2:
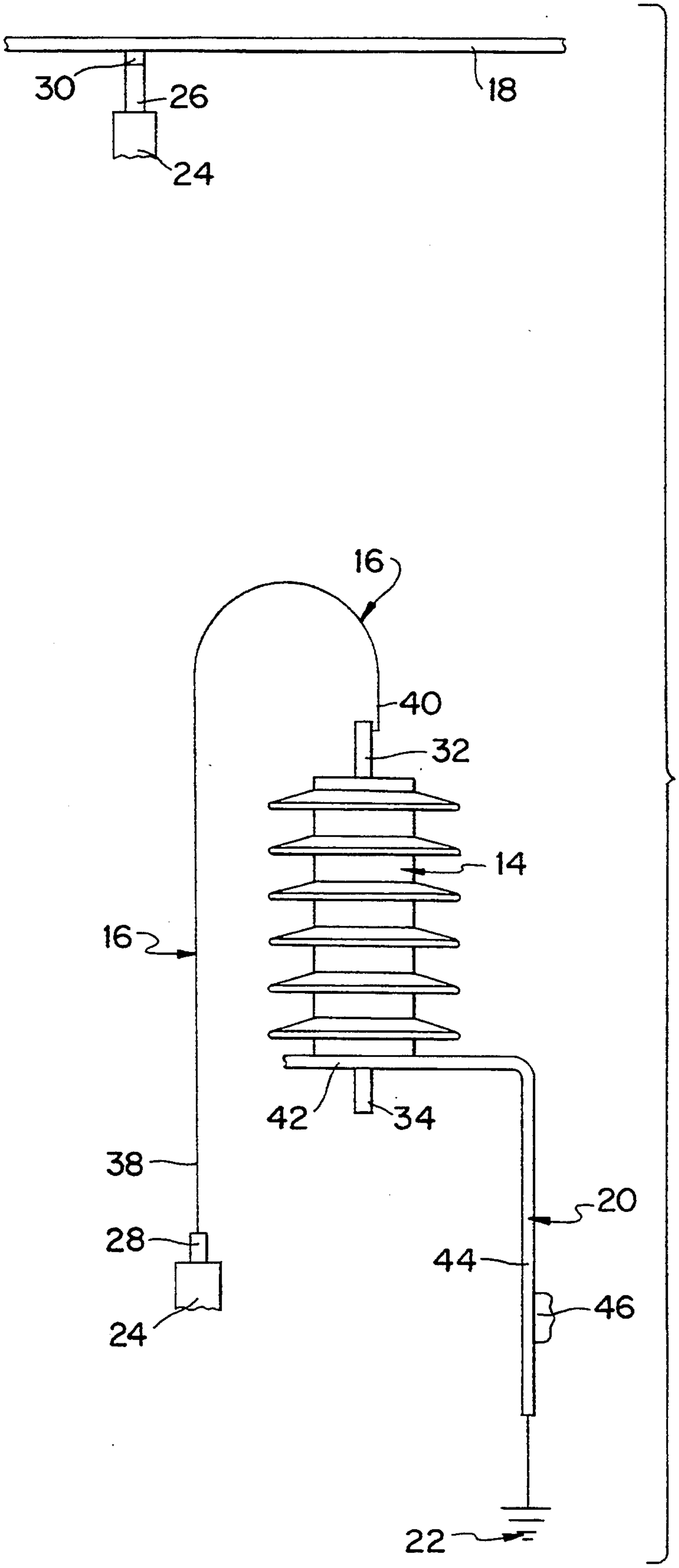
FIG. 2 is a side elevational view showing the surge protection system of FIG. 1 after separation of the isolator.

Upon separation of the two isolator terminals, strap 16 will drop away as illustrated in FIG. 2. In the position illustrated in FIG. 2, the arrester is completely and positively removed from electrical connection with power line conductor 18 such that the arrester and the strap are at ground potential, and not at the potential of power line conductor 18. Providing the failed arrester at ground potential produces a safer environment, as compared to conventional arrangements with the failed arrester at the potential of the power line conductor. A lineman can more safely replace a failed arrester at ground potential, since the injury or damage from mishandling is minimal. Substantial injury or damage can occur from mishandling a failed arrester at line potential. This also eliminates tracking which would otherwise occur on an insulating bracket. Additionally, this provides a clear and positive indication of surge arrester failure. Surge arrester failure is not as readily apparent when the surge arrester weathershed housing is formed of an elastomer, rather than porcelain.

While one embodiment has been chosen to illustrate the invention, it will be understood by those skilled in the art that changes and modifications can be made therein without departing from the scope of the invention as defined in the appended claims.

What is claimed is:

1. An arrester assembly, comprising:

a surge arrester having first and second electrically conductive arrester terminals at opposite ends thereof;

an isolator having first and second electrically conductive isolator terminals at opposite ends thereof, said isolator including coupling means for electrically connecting said isolator terminals when said surge arrester functions properly and for physically disconnecting said isolator terminals when said surge arrester electrically malfunctions;

a flexible, electrical conductor connecting said second isolator terminal to said first arrester terminal;

electrically conductive clamp means for connecting said first isolator terminal to a power line conductor, with said surge arrester being electrically coupled to the power line only through said flexible electrical conductor, said isolator and said clamp means; and electrically conductive support means for connecting said second arrester terminal to ground.

2. An arrester assembly according to claim 1 wherein said coupling means of said isolator comprises an explosive charge for physically separating said isolator terminals.

3. An arrester assembly according to claim 1 wherein said support means comprises a metal bracket.

4. An arrester assembly according to claim 3 wherein said bracket comprises means for mounting said surge arrester on one of a pole and a grounded transformer.

5. An arrester according to claim 1 wherein said clamp means directly suspends said isolator from the power line.

6. An arrester according to claim 5 wherein said isolator is spaced from said arrester and is coupled to said arrester by said flexible conductor only.

7. A surge protection system, comprising;

a power line conductor;

an isolator having first and second electrically conductive isolator terminals at opposite ends thereof, said isolator including coupling means for electrically connecting said isolator terminals when low currents and high pulse currents flow between said isolator terminals and for physically and electrically separating said isolator terminals when high prolonged currents flow between said isolator terminals, said first isolator terminal being coupled to said power line conductor;

a flexible, elongated electrical conductor having opposite first and second ends, said first end being connected to said second isolator terminal;

a surge arrester spaced from said isolator and having first and second electrically conductive arrester terminals at opposite ends of said surge arrester, said second end of said flexible conductor being coupled to said first arrester terminal, with said surge arrester being electrically coupled to the power line only through said flexible electrical conductor and said isolator; and electrically conductive ground connector means, coupled to said second arrester terminal, for coupling said surge arrester to ground;

whereby said isolator, said flexible conductor, and said surge arrester are connected in sequence and in series between said power line conductor and the ground, and said surge arrester is electrically disconnected from said power line upon separation of said isolator terminals.

8. A surge protection system according to claim 7 wherein said coupling means of said isolator comprises an explosive charge for physically separating said isolator terminals.

9. A surge protection system according to claim 8 wherein said ground connector means comprises a metal bracket.

10. A surge protection system according to claim 9 wherein said bracket comprises means for mounting said surge arrester on one of a pole and a ground transformer.

11. A surge protection system according to claim 5 wherein electrically conductive clamp means directly suspends said isolator from said power line.

12. A surge protection system according to claim 5 wherein said isolator is spiced from said arrester and is coupled to said arrester by said flexible conductor only.

* * * * *